US006493918B1

(12) United States Patent
Bell et al.

(10) Patent No.: US 6,493,918 B1

(45) Date of Patent: Dec. 17, 2002

(54) METHOD AND APPARATUS FOR LIFTING TABS OF A LAMINATE FROM A SUBSTRATE

(75) Inventors: Phillip Mark Bell, Overland Park, KS (US); Ronald Dean Robertson, Kansas City, MO (US); George Edward MacEwen, Kansas City, MO (US)

(73) Assignee: Huhtamaki Consumer Packaging, Inc., DeSoto, KS (US)

( * ) Notice: Subject to any disclaimer, the term of this patent is extended or adjusted under 35 U.S.C. 154(b) by 42 days.

(21) Appl. No.: 09/655,534

(22) Filed: Sep. 5, 2000

Related U.S. Application Data

(62) Division of application No. 09/281,884, filed on Mar. 31, 1999, now Pat. No. 6,163,951.

(51) Int. Cl.[7] .................................................. B23P 19/00

(52) U.S. Cl. ..................... 29/426.5; 29/426.4; 156/247; 156/344

(58) Field of Search ............................ 29/426.1, 426.4, 29/426.5, 566; 72/126; 156/247, 344, 584; 413/1, 31, 62, 69

(56) References Cited

U.S. PATENT DOCUMENTS

| | | | | | |
|---|---|---|---|---|---|
| 487,764 | A | * | 12/1892 | Norton | 413/31 |
| 528,305 | A | * | 10/1894 | Schaake | 413/31 |
| 2,491,535 | A | * | 12/1949 | Tofanelli | 72/397 |
| 3,633,469 | A | * | 1/1972 | Kinney | 493/159 |
| 3,924,315 | A | * | 12/1975 | Cady et al. | 29/562 |
| 4,013,497 | A | * | 3/1977 | Wolf | 156/154 |
| 4,248,661 | A | * | 2/1981 | Bleiman et al. | 156/584 |
| 4,325,775 | A | * | 4/1982 | Moeller | 156/584 |
| 4,338,767 | A | * | 7/1982 | Cochran | 53/492 |
| 4,435,969 | A | * | 3/1984 | Nichols et al. | 72/126 |
| 4,614,106 | A | * | 9/1986 | Forget | 72/384 |
| 4,670,085 | A | * | 6/1987 | Van Der Meer et al. | 156/584 |
| 4,717,442 | A | * | 1/1988 | Hopson | 156/584 |
| 4,830,231 | A | * | 5/1989 | Smith | 222/327 |
| 4,867,836 | A | * | 9/1989 | Hamamura et al. | 156/584 |
| 4,885,924 | A | * | 12/1989 | Claydon et al. | 72/109 |
| 4,938,818 | A | | 7/1990 | Dzedzej et al. | |
| 4,944,832 | A | * | 7/1990 | Abe et al. | 156/584 |
| 5,018,379 | A | * | 5/1991 | Shirai et al. | 72/354.6 |
| 5,121,621 | A | * | 6/1992 | Ihly | 72/126 |
| 5,209,795 | A | * | 5/1993 | DeRosa et al. | 156/69 |
| 5,217,538 | A | * | 6/1993 | Buchholz et al. | 134/25.4 |
| 5,317,794 | A | * | 6/1994 | Lerner et al. | 29/426.3 |
| 5,340,421 | A | * | 8/1994 | Shea et al. | 156/69 |
| 5,372,672 | A | * | 12/1994 | Seifert et al. | 156/584 |
| 5,390,471 | A | * | 2/1995 | Marchadour | 53/334 |
| 5,442,851 | A | * | 8/1995 | Lerner et al. | 29/822 |
| 5,467,628 | A | * | 11/1995 | Bowlin et al. | 72/126 |
| 5,477,720 | A | * | 12/1995 | Lentz et al. | 72/124 |
| 5,556,364 | A | * | 9/1996 | Konzal | 493/109 |
| 5,658,416 | A | * | 8/1997 | MacCollum et al. | 156/344 |
| 5,672,231 | A | * | 9/1997 | Willkens et al. | 156/344 |
| 5,685,053 | A | * | 11/1997 | Deonarine et al. | 29/426.4 |
| 5,718,030 | A | * | 2/1998 | Langmack et al. | 29/426.3 |
| 5,762,753 | A | * | 6/1998 | Clough | 156/584 |
| 5,843,276 | A | * | 12/1998 | Watanabe | 156/584 |
| 5,853,275 | A | * | 12/1998 | Lentz et al. | 413/73 |
| 5,855,575 | A | * | 1/1999 | Solomon et al. | 604/403 |
| 5,861,077 | A | * | 1/1999 | Kamijo et al. | 156/344 |
| 6,068,727 | A | * | 5/2000 | Weaver et al. | 156/344 |
| 6,163,951 | A | * | 12/2000 | Bell et al. | 29/566 |

FOREIGN PATENT DOCUMENTS

| | | | | |
|---|---|---|---|---|
| FR | 2698338 | * | 5/1994 | 53/334 |
| JP | 59163029 | * | 9/1984 | 72/126 |
| JP | 404028423 | * | 1/1992 | 72/126 |

* cited by examiner

*Primary Examiner*—S. Thomas Hughes
*Assistant Examiner*—Essama Omgba
(74) *Attorney, Agent, or Firm*—Shook, Hardy & Bacon L.L.P.

(57) ABSTRACT

A method and apparatus for lifting the tabs of a protective seal with edges embedded in a laminate. The base of the device has an annular top having a plurality of cartridge receiving apertures spaced equally from one another. Each hole receives a tab engagement assembly comprising a cartridge, a spring, and a finger have an abutment surface. The finger is pivotally fastened at one end within the slot of the cartridge and is biased away from the cartridge by the spring. When the base is placed in proximate relationship with the laminate seal patch secured to the substrate, the rotating base causes the abutment surfaces of the fingers to drag across the periphery of the laminate seal in a circular motion. The stresses created on the tabs of the protective seal cause the embedded edges to be lifted. The lifted tabs are accessible to the end user and the protective seals may be easily peeled from the substrate when desired by the end user.

1 Claim, 2 Drawing Sheets

METHOD AND APPARATUS FOR LIFTING TABS OF A LAMINATE FROM A SUBSTRATE

This application is a divisional application of U.S. application Ser. No. 09/281,884, filed Mar. 31, 1999, now U.S. Pat. No. 6,163,951.

BACKGROUND OF THE INVENTION

This invention relates generally to the protective seals of material covering container openings, and deals more particularly with an improved method and apparatus for lifting the comers of a protective patch of material used to seal a cartridge type dispenser containing viscous food sauces.

Protective seals are used in a wide number of containers. Oftentimes, the seals prevent the contents of the container from escaping before the initial use of the product within the container. The seals are generally made from thin, malleable metals such as aluminum. In addition to preventing premature escape of the container's contents, the aluminum patch prevents air and other contaminants from interacting with the contents of the container. Further, the seal may give the user added assurance that no tampering occurred with the contents of container before the initial use. Thus, seals are particularly useful for containers for storing food products and pharmaceuticals which may spoil and are affected by contact with air and various contaminants. Seals may be placed over the openings of containers in a variety of manners. In some instances, the seals may extend beyond the edge of the opening so that the periphery of the protective seals are not in proximity with the surface of the container. For instance, protective seals used to cover the circular openings of aspirin bottles use protective seals which extend somewhat beyond the lip of the opening, but may still allow the cap of the container to be screwed to the bottle. When the cap is removed, the user simply grasps the exposed tabs and pulls the protective seal from the remainder of the bottle. However, for other containers, it is either undesirable or impracticable to have the edges of the protective seal extend beyond the surface of the container.

One example of such a container is prevalent in the retail food service industry. In fast service restaurants and other retail food establishments, food sauces of various types must be dispensed in a large number of portions each containing a relative small quantity of sauce. Some sauces such as vinegar may be placed in conventional bottles which are compressed by the user to force the contents out of the bottle. However, sauces such as mayonnaise are relatively viscous and are not efficiently and accurately dispensed from bottles formed from flexible materials. It has been found to be convenient to package a wide variety of food sauces in cartridges from which the sauces are dispensed by hand held dispensing guns similar to caulking guns.

The cartridges used in these dispensing guns typically employ composite discs having disk valves at one end of the cartridge to evenly distribute the sauces when forced by the plunger of the cartridge gun. Likewise, the valves retain the sauces within the cartridge when the plunger of the gun is not actuated. Reference may be made to U.S. Pat. No. 4,830,231 for a more thorough discussion of this type of disk valve. Generally, each composite disc comprises at least one paperboard layer framing the valves formed on a disc valve layer. The disc valve layer is typically made of polyethylene and has a number of slits or similar valves cut into the layer to allow the food sauce to flow from the container. Protective laminate patches comprising thin foil seals are placed over the disc valves of the composite disc substrate to seal the contents of the container. The seals are adhered to the disc valve layer substrate along a circular path at the interior of the edges of the foil laminates. The peripheral edges of protective seals extend beyond the framed PET disc valve layer and terminate at and overlap with the paperboard layer. When the end user wants to open a new container, the user pulls one of the comer tabs of the foil seal from the cartridge disc substrate and peels the protective foil laminate away from the remainder of the container.

In prior art methods used to manufacture cartridge discs, the foil laminate patches were cut before being adhered to the disc valve. The rectangular laminates were adhered to the paperboard layer of the disc and the tab area between the adhesive connection and the edge of the disc was relatively separated from the disc and easy for the user to grasp. Thus, the seals were easy to remove. The discs were manufactured by one machine and the protective seals were applied on another machine. This required that the discs be moved from the disc formation machine to the seal applicator machine and led to a number of inefficiencies. For instance, the slit valves on the disc could become lodged between the tabs and paperboard base of the adjacent disc when the discs were stacked.

A new manufacturing process was developed in which the foil tab was applied on the cartridge disc formation machine. Essentially, portions of foil from a supply roll are adhered to the upper surface of the cartridge disc after the composite disc is formed. The foil laminate is then cut from the roll. The depth of the cut severs the foil laminate from the foil supply roll without cutting the paperboard layer underlying the edge of the protective seal on the cartridge disc. Since the manufacturing method allows the foil laminate to be secured to the cartridge disc in one machine, one step of the process is eliminated and the associate inefficiencies are removed. However, the cutting technique tends to embed the edges of the protective foil tab patch into the paperboard layer and the foil laminate is difficult to remove.

Accordingly, the need exists for a tab lifting method and apparatus which will effectively lift the embedded tabs of protective seals applied during the disc formation process. The present invention fills these and other needs and overcomes the drawbacks associated with the prior art.

SUMMARY OF THE INVENTION

Accordingly, it is an object of this invention to provide a device which lifts the tabs of a protective laminate from a substrate so that the laminate is easily removable from the substrate.

It is also an object of this invention to provide a device for lifting tabs of a protective material from a substrate without causing the discs to jam during the manufacturing process.

Another object of this invention is to provide a device for lifting foil tabs of protective seal which does not add an additional step or machine to the manufacturing process.

A further object of this invention is to provide a method for lifting the embedded edges of a laminate from a substrate.

Accordingly, the present invention provides for a method and apparatus for lifting the tabs of a protective seal with edges embedded in a laminate. The base of the device has an annular top having a plurality of cartridge receiving apertures spaced equally from one another. Each hole receives a tab engagement assembly comprising a cartridge, a spring, and a finger having an abutment surface. The finger is pivotally fastened at one end within the slot of the cartridge and is biased away from the cartridge by the spring. When the base is placed in proximate relationship with the laminate seal patch secured to the substrate, the rotating base causes the abutment surfaces of the fingers to drag across the periphery of the laminate seal in a circular motion. The stresses 20 created on the tabs of the protective seal cause the embedded edges to be lifted. The lifted tabs are accessible to the end user and the protective seals may be easily peeled from the substrate when desired by the end user.

BRIEF DESCRIPTION OF THE DRAWINGS

In the accompanying drawings which form a part of the specification and are to be read in conjunction therewith and in which like reference numerals are used to indicate like parts in the various views.

DESCRIPTION OF THE EMBODIMENT

Figure 1:
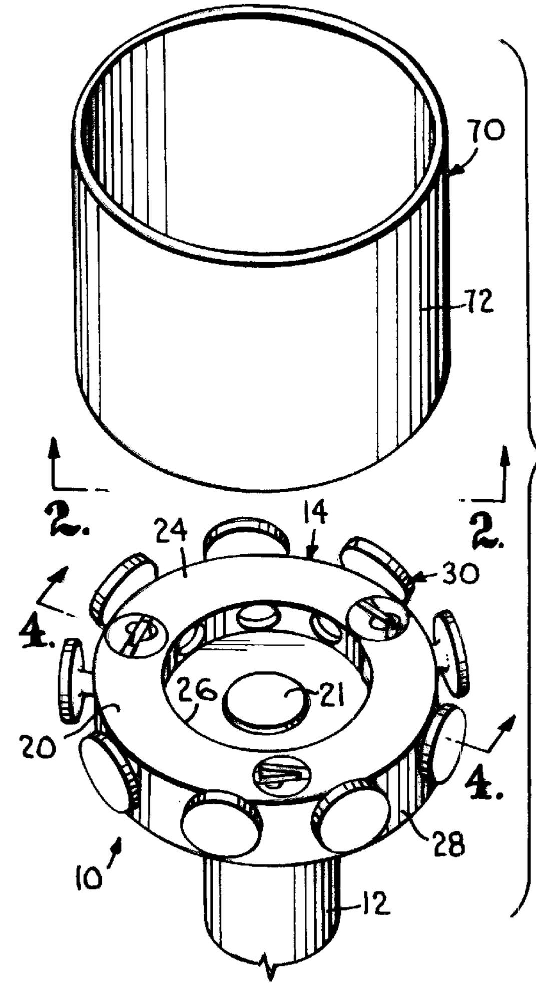
FIG. 1 is an exploded perspective view of a tab lifter assembly constructed according to a preferred embodiment of the present invention with the container removed from engagement with the tab lifter assembly.
Figure 4:
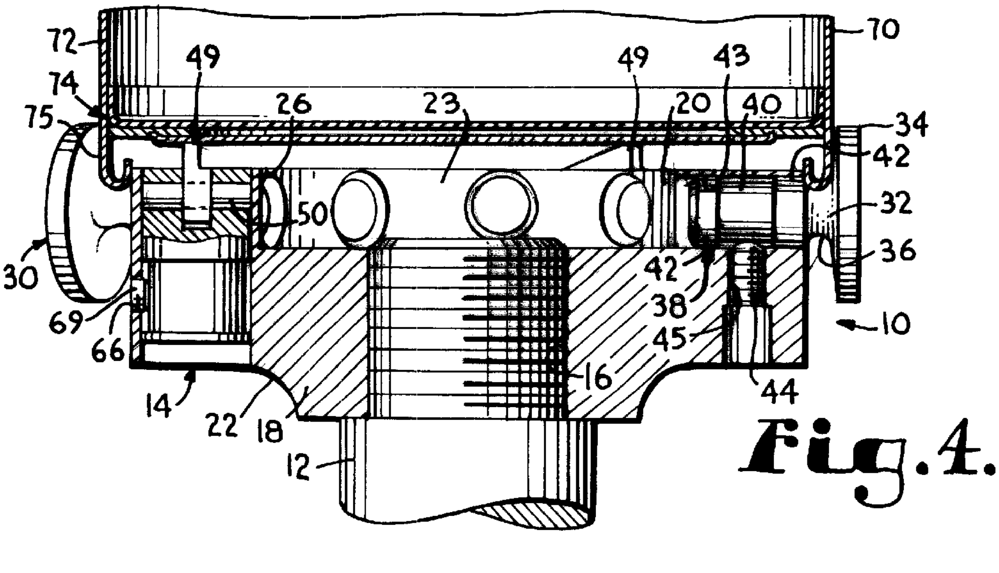
FIG. 4 is a sectional view of the tab lifter assembly of the present invention engaging the container.

Referring now to the drawings in greater detail and initially to FIGS. 1 and 4, a tab lifter assembly designated generally by the numeral 10 is shown. Tab lifter assembly 10 has a rotatable shaft 12 and a base 14. In the preferred embodiment, the base 14 is adapted from a crimp head used to form the curled end of the container sidewall as known in the prior art and more fully described below. Generally, the base 14 has a lower portion 18 and a upper cylindrical portion 20 having a larger diameter than lower portion 18. A fillet 22 extends around crimp head base 14 along the exterior of lower portion 18. Shaft 12 is frictionally fit within a bore, 16 centrally formed within the bottom of base 14. A cylindrical cavity 23 is formed centrally at the top of upper portion 20 and intersects with bore 16. When the shaft 12 is attached to the base 14, the end 21 of shaft 12 extends slightly into cavity 23. An annular top 24 defining a plane is defined by the outer edge of the cavity sidewall 26 and the outer sidewall 28 of upper portion 20.

Preferably, a plurality of crimp pins 30 extend radially from the outer sidewall 28 of crimp head base 14. The crimp pins 30 have stems 32 terminating at cap structures 34. The arcuate walls 36 of the stems 32 are inwardly concave so that each stem 32 has the smallest diameter near the midpoint between the outer sidewall 28 and corresponding cap structure 34. The cap structures 34 are positioned at normal angles with respect to the central axis of the stems 32 and extend outwardly beyond the plane of annular top 24. The cylindrical cap structures 34 are relatively thin and have a diameter preferably at least three times that of the stems 32 near their midpoint.

Stems 32 of crimp pins 30 are connected to securable adjustment shafts 38. The adjustment shafts 38 include an central shaft 40 located between a pair of larger knob shafts 42. The crimp pins 30 may be positioned at varying depths within crimp pin apertures 43 extending radially inwardly from the outer sidewall 28 towards the center of crimp head base 14. When the crimp pins 30 are inserted to the appropriate depth, a set screw 44 extending perpendicularly to the axis of the central shaft 40 is tightened within a threaded aperture 45 so that the terminal end of set screw 44 is in firm frictional engagement with central shaft 40. Preferably, all of the crimp pins 30 are set at an equal distance from the center of the crimp head base 14 and are spaced equally from one another around a circumference of upper portion 20. In the preferred embodiment, the crimphead includes nine crimp pins 30.

Figure 5:
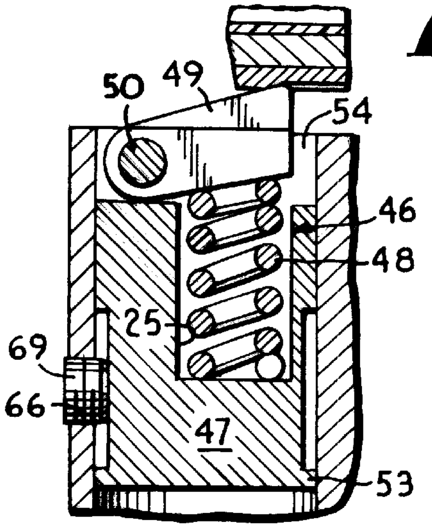
FIG. 5 is an enlarged fragmentary sectional view of the tab engagement assembly of the present invention engaging the composite disc of the container.
Figure 6:
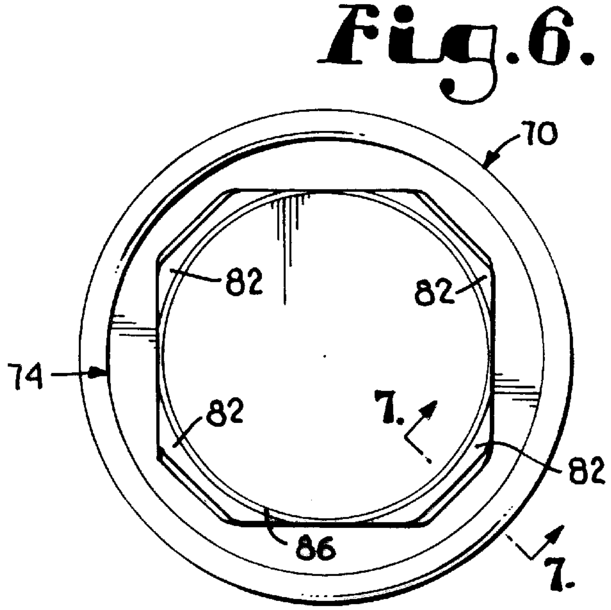
FIG. 6 is a bottom plan view of the container after the tabs are lifted by the tab lifter assembly of the present invention.
Figure 8:
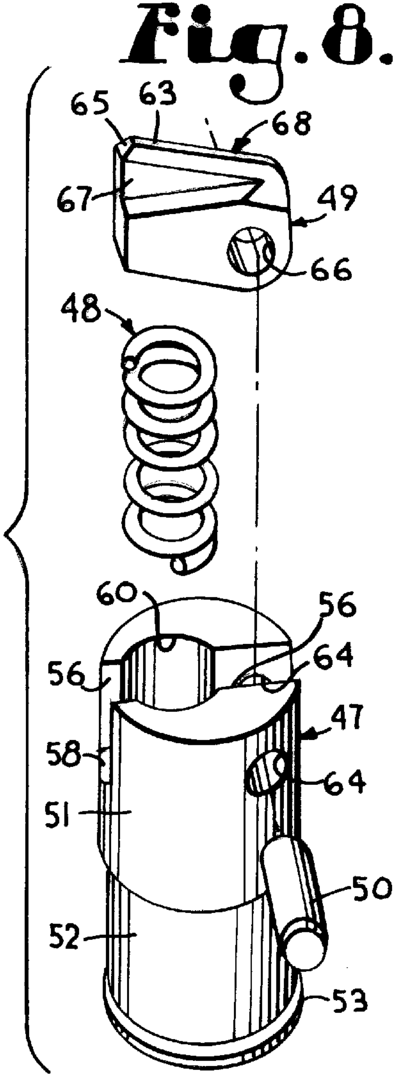
FIG. 8 is a top perspective exploded view of the tab engagement assembly of the present invention.

With reference to FIGS. 5 and 8, the tab engagement assembly 46 of the present invention is shown. Each tab engagement assembly 46 has a cartridge 47, a compression spring 48, an engaging finger 49, and a dowel pin 50. The generally cylindrical cartridge 47 has a head 51, a support base 52, and a flange 53. The head 51 has a slightly larger diameter than the support base 52. Each cartridge has a slot 54 defined by a pair of opposing parallel sidewalls 56 and a slot bottom 58. The slot 54 is formed along a diameter of the head 51. The spring 48 is inserted within a chamber 60 drilled at position offset from the center of cartridge 47. The spring 48 rests on the base of the chamber 60 and extends above the slot bottom 58 when uncompressed. The engaging finger 49 fits within slot 54 and is pivotally mounted at one end by dowel pin 50. The dowel pin 50 is placed in opposing apertures 64 extending from the interior of slot sidewalls 56 to the outer surface of the cartridge 47. The opposing end of the finger 49 engages the spring 48 and is biased outwardly from the cartridge 47.

In the preferred embodiment, the engaging finger 49 has a spine 67 extending from the side of engaging finger 49 opposite sprig 48. The spine 67 is about half the width of the remainder of engaging finger 49. An abutment surface 68 is defined by the beveled top 63 and chamfered end 65 of spine 67.

After the spring 48 is placed in chamber 60 and engaging finger 49 is pinned within the slot sidewalls 54, the tab engagement assembly. 46 is inserted within one of the cartridge receiving chambers 25. In the preferred embodiment, three cartridge receiving chambers 25 are formed on annular top 24 at positions angularly equidistant from one another. However, the present invention may have only one tab engagement assembly 46 and accompanying cartridge receiving chamber 26. The spine 67 of engaging finger 49 is positioned generally tangentially to the circumferential line of the crimp head base 14 on which the cartridge receiving holes 25 are placed. The spines 67 extend rearwardly with respect to the direction of angular motion of the rotatable crimp head base 14 as discussed further below. The abutment surface 68 of engaging finger 49 extends rearwardly at an acute angle with respect to the surface of cartridge 47.

Each cartridge 47 is slidably received within a cartridge receiving chamber 25 formed at the surface of annular top 24 of crimp head base 14. The broad flange 53 rests upon the bottom of chamber 25 when the tab engagement assembly is placed within the crimp head base 14. A set screw 69 is inserted through a threaded hole 66 formed on the outer sidewall 28 of crimp head base 14. The end of the set screw 69 engages the cartridge 47 to prevent rotation and translation of the cartridge within the cartridge receiving hole 25.

Figure 3:
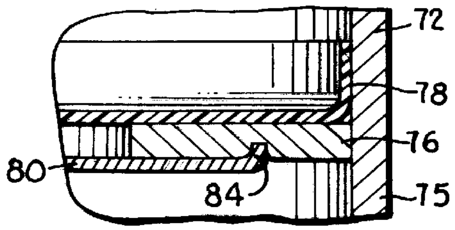
FIG. 3 is a enlarged fragmentary sectional view of the container taken along line 3—3 of FIG. 2.

With reference again to FIG. 1, the tab lifter assembly 10 operates on a container designated generally as numeral 70. The cylindrical container 70 is preferably formed from paper or a material with similar characteristics. The container 70 has a relatively thin sidewall 72 and a composite cartridge disc 74 is placed within sidewall 72 at one end. With reference to FIG. 4, outer portion 75 of sidewall 72 extends beyond the disc. The cartridge disc has a plurality of layers as fully described in U.S. Pat. No. 4,830,231. With reference to FIG. 3, in the preferred embodiment, the composite cartridge disc 74 has an annular outer layer 76 formed from paperboard and circular valve disc layer 78 made from polyethylene. Preferably, the cartridge disc 74 has a plurality of slit valves (not shown) formed in the valve disc layer 78 which allow the contents of the container to be dispersed when pressure is applied to the rear cap (not shown) of the container 70. The annular outer layer 76 is secured to the top of valve disc layer 78 and frames the slit valves of the valve disc layer 78.

Figure 2:
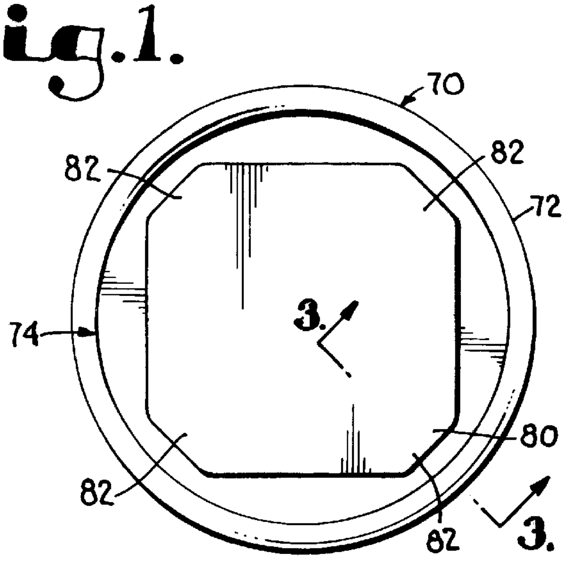
FIG. 2 is a bottom view of the container before the tabs are lifted taken along line 2—2 of FIG. 1.

With reference to FIG. 2, the protective laminate patch 80 is shown. Patch 80 seals the container and protects the contents of the container from the outside environment. The laminate patch 80 is preferably formed from a metal foil which is most preferably aluminum. The laminate patch 80 is generally square-like and fully covers the circular valve disc layer 78 mounted within outer layer 76. In the preferred embodiment, the comers of the laminate patch 80 are cut diagonally so that the laminate patch 80 is eight-sided. The laminate patch 80 is adhered to the outer layer 76 at a position proximate the inner diameter of annular outer layer 76. Tabs 82 are located at each of the blocked comers and are defined by the area between the perimeter edge 84 of the laminate patch 80 and the adhesive portion at which the laminate patch 80 is adhered to the outer layer 76. With reference to FIG. 3, the perimeter edge 84 of the laminate patch 80 is slightly embedded within the surface of the annular outer layer 76. This is due to the cut performed during the construction of the composite cartridge disc 74 as described in the background. Thus, the embedded edge 84 of the laminate patch 80 are difficult for the end user to grasp. Since the tabs 82 are not easily accessible, removal of the laminate patch 80 is quite difficult.

In operation, the container 70 is placed on a mandrel (not shown) and is held to the mandrel by negative pressure creating a vacuum on the interior of the composite cartridge disc 74. With reference to FIG. 1, the crimp head base 14 rotates continuously in the counterclockwise direction. The shaft 12 of the tab lifter assembly 10 moves axially inward so that the crimp head base 14 is received within the end of container 80. The crimp head base 14 first contacts the container sidewall 72 at the arcuate walls 36 of stems 32. The contact between the stems 32 on rotating crimp head base 14 and the container 70 cause the outer sidewall portion 75 of the container to curl inwardly. The outer sidewall portion 75 begins to overlap over itself and a smooth curved outer edge is formed. This crimping process is well known in the prior art.

Figure 7:
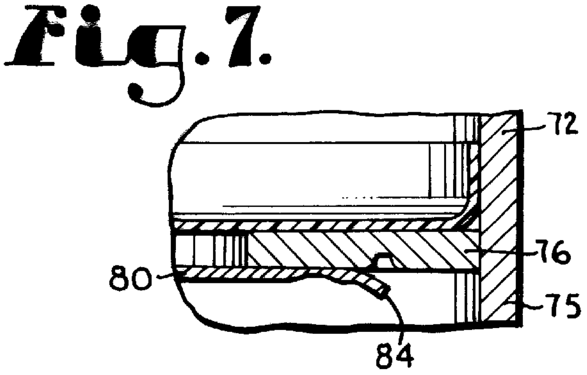
FIG. 7 is an enlarged fragmentary view of the container taken along line 7—7 of FIG. 6.

With reference to FIGS. 4 and 5, when the crimping of the sidewall portion. 75 is nearly complete, the abutment surfaces 68 on engagement fingers 49 contact the laminate patch 80. The fingers 49 are depressed slightly inwardly so that spring 48 forces the fingers 49 into frictionally engagement with the periphery of the laminate patch 80. The fingers 49 remain biased towards the laminate patch 80 and the abutment surfaces 68 on spines 67 are dragged across the patch 80 along a circular path 86 due to the rotation of crimp head base 14. The dragging motion of the abutment surface stretches the laminate layer and creates internal stresses within the tabs 82 of the laminate patch 80. Each abutment surface 68 engages the patch 80 for several revolutions along path 86. With reference to FIG. 7, the cumulative effect of the stresses causes at least one of the four tabs 82 to lift from the embedded position within outer layer 76 of composite cartridge disc 74.

The shaft 12 then retracts crimp head 14 from the proximate, adjacent relationship with cartridge disc 74 of container 70. When the container 70 is removed from the mandrel, the patch 80 is easily removable by grasping the lifted tab 82 and pulling the patch 80 from the composite cartridge disc 74.

Figure 9:
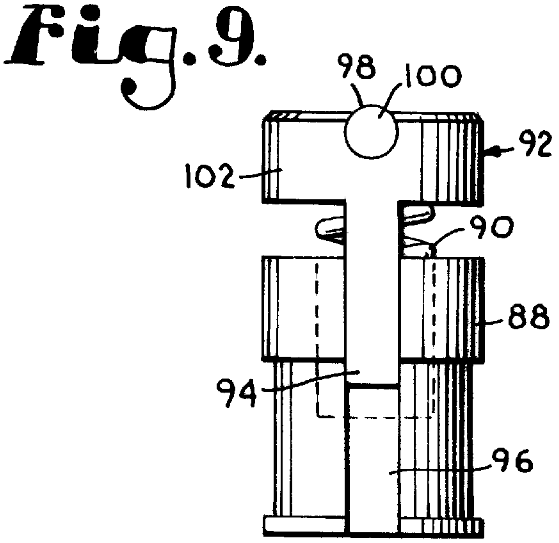
FIG. 9 is a side elevational view of an alternative embodiment of the tab engagement assembly of the present invention.

In FIG. 9, an alternative embodiment of the tab engagement assembly is shown. The assembly consists of a cartridge 88, a spring 90, and a plunger 92. A base 94 of plunger 92 is inserted within a slot 96 formed within cartridge 88. The spring 90 causes the plunger 92 to be biased away from the cartridge 88. The abutment surface 98 is located on a small cylindrical member 100 formed on the head 102 of the plunger 92. Each cartridge 88 is placed within a cartridge receiving chamber 25 on the crimp head base 14. When the cartridge 88 is secured by the set screw 69 as described more fully above, the axis of the cylinder 100 is oriented in the radial direction with respect to the center of rotatable crimp head base 14.

Since the tab lifting process occurs during the crimping process instead of the composite disc formation process, the discs may be stacked upon one another until being placed into the container. Also, a separate tab lifter machine is unnecessary since the laminate patch 80 may be placed on the composite cartridge disc 74 during the assembly of the discs, and the tabs may be lifted as part of the crimping process, a subsequent, independent phase of production.

In the preferred embodiment, the tab lifting process is incorporated with the conventional step of crimping the sidewall of the container. The tabs are lifted from the cartridge disc after the disc is formed and placed within the end of the cylindrical container. The integration of the novel process with the crimping step eliminates the need for a separate tab lifting machine. Also, the problems associated with stacking the cartridge discs after the tabs are lifted are eliminated because the tabs are only lifted after the discs are set in the containers. While the tab lifting process is integrated with the crimping process in the preferred embodiment, the tab lifting process could be performed independently of the crimping step. For instance, the novel tab lifting process could be performed on containers in which crimping is unnecessary. Also, the process could be performed before or after the crimping process. Additionally, the tab lifting process could be incorporated in the cartridge disc formation process if the subsequent steps in manufacturing the container do not require stacking the discs.

The method and apparatus of the present invention is also not limited to lifting tabs adhered to cartridge discs. The invention may be used to lift the edges of a laminate from a substrate in a number of other applications in which the tabs are difficult to grasp or remove.

From the foregoing, it will be seen that this invention is one well adapted to attain all the ends and objects herein-above set forth together with other advantages which are inherent to the structure. It will be understood that certain features and subcombinations are of utility and may be employed without reference to other features and subcombinations. This is contemplated by and is within the scope of the claims. Since many possible embodiments may be made of the invention without departing from the scope thereof, it is to be understood that all matter herein set forth or shown in the accompanying drawings is to be interpreted as illustrative and not in a limiting sense.

Having thus described the invention, what is claimed is:

1. A method for lifting at least one edge of a laminate from a substrate using a rotatable base, the base having a top defining a plane and an axis of rotation substantially perpendicular to the top plane and at least one abutment surface on the top at a distance from the axis of rotation, the method comprising:

rotating the base;

contacting the laminate proximate the at least one edge with the abutment surface;

dragging the abutment surface on the laminate in a circular path for at least one revolution; and disengaging the abutment surface from the laminate.

* * * * *